United States Patent Office 2,862,007
Patented Nov. 25, 1958

---

2,862,007

TRIPLY UNSATURATED 1,3-DIOXOLANES AND PROCESS FOR THEIR PREPARATION

Harry A. Stansbury, Jr., South Charleston, and Howard R. Guest, Charleston, W. Va., assignors to Union Carbide Corporation, a corporation of New York No Drawing. Application September 27, 1957
Serial No. 686,583

6 Claims. (Cl. 260—340.9)

This invention relates to 1,3-dioxolanes and to a process for their preparation. More particularly, the present invention relates to triply unsaturated 1,3-dioxolanes and to a process for their preparation.

The compounds of this invention may be represented by the structural formula:

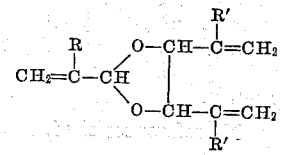

wherein R and R' are selected from the group consisting of hydrogen and lower alkyl.

Illustrative of such compounds are 4,5-diisopropenyl-2-vinyl-1,3-dioxolane; 2,4,5-triisopropenyl-1,3-dioxolane; 2,4,5-trivinyl-1,3-dioxolane and 2-isopropenyl-4,5-divinyl-1,3-dioxolane.

These compounds are useful as chemical intermediates. They are also active monomers which can be copolymerized with other vinyl monomers, such as vinyl chloride, vinylidene chloride and acrylonitrile. The resulting polymers are useful as dye assistants for acrylic fibers. These polymers have pendant double bonds which may be cross-linked to form insoluble, tough resins.

The compounds of this invention are prepared by reacting an unsaturated aldehyde having the formula:

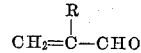

with a doubly unsaturated diol having the formula:

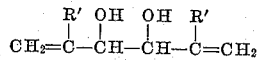

wherein R and R' have the values previously assigned, at a temperature of from about 0° C. to about 100° C. and preferably from about 20 to about 50° C., a pressure of from about 5 to about 150 p. s. i. a. preferably from about 10 to about 20 p. s. i. a. for a period of from about 0.5 to about 50 hours. The reaction is preferably conducted in the presence of an acidic catalyst, such as hydrochloric acid or sulfuric acid. After the reaction is complete, the catalyst is neutralized and the desired triply unsaturated dioxolanes are recovered by fractional distillation.

The following examples are illustrative.

Example I

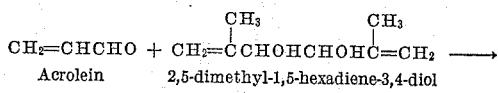

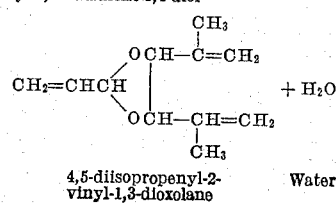

A mixture of 142 grams of 2,5-dimethyl-1,5-hexadiene-3,4-diol (1 mole) and 3 milliliters of 37 percent hydrochloric acid catalyst (.03 equivalent) was stirred at 25° C.–45° C. while 174 grams of 96.4 percent acrolein (3 moles) were added all at once. After stirring for 20 hours at 25° C.–30° C., 4.1 grams of anhydrous sodium acetate (.05 equivalent) were added to neutralize the catalyst and 100 milliliters of toluene were also added. The mixture was fractionated under reduced pressure to yield 4,5-diisopropenyl-2-vinyl-1,3-dioxolane having the following properties: boiling range of 55° C.–61° C./2 mm. Hg, $n_D^{30}$ of 1.4594, specific gravity at 20/20° C. of 0.957, purity (determined by analytical bromination) of 98.2 percent, percent carbon found 71.9 (theory 73.3), percent hydrogen found 8.8 (theory 8.9). The yield of this material, based on the unsaturated diol, was 78 percent.

Example II

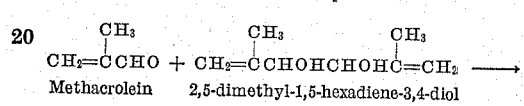

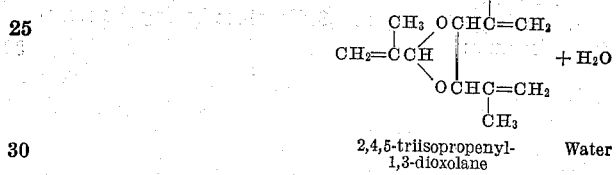

A solution of 199 grams of 2,5-dimethyl-1,5-hexadiene-3,4-diol (1.4 moles) and 6 milliliters of 37 percent hydrochloric acid catalyst (.06 equivalent) was fed to 392 grams of methacrolein (5.6 moles) over a period of 20 minutes while stirring at 25° C. After a reaction period of 80 minutes at 25° C., 8.2 grams of anhydrous sodium acetate (0.1 equivalent) were added. The mixture was fractionated to yield 2,4,5-triisopropenyl-1,3-dioxolane having the following properties: boiling range of 66° C.–68° C./2 mm. Hg, $n_D^{30}$ of 1.4617, specific gravity at 20/20° C. of 0.945, purity (determined by analytical bromination) of 106.5 percent, percent carbon found 73.5 (theory 74.2), percent hydrogen found 9.4 (theory 9.4). The yield of this material, based on the unsaturated diol, was 81 percent.

Example III

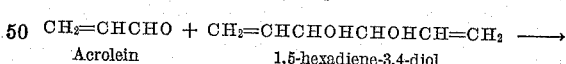

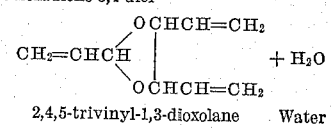

A solution of 5 milliliters of 37 percent hydrochloric acid catalyst (0.05 equivalent) in 171 grams of 1,5- hexadiene-3,4-diol (1.5 moles) was fed to 358 grams of 96.4 percent acrolein (6.0 moles) over a period of 15 minutes while stirring at 25° C.–35° C. After a reaction period of an hour at 30° C., 6.6 grams of anhydrous sodium acetate (.08 equivalent) were added. The mixture was fractionated to yield 2,4,5-trivinyl-1,3-dioxolane having the following properties: boiling range of 37° C.–40° C./2 mm. Hg, $n_D^{30}$ of 1.4542, specific gravity at 20/20° C. of 0.956, purity (determined by analytical bromination) of 96.5 percent, percent carbon found 70.5 (theory 71.0), percent hydrogen found 8.0 (theory 7.9). The yield of this material, based on the unsaturated diol, was 76 percent.

Example IV

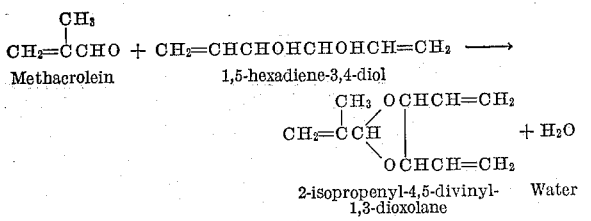

A solution of 4 milliliters of 37 percent hydrochloric acid catalyst (.04 equivalent) in 114 grams of 1,5-hexadiene-3,4-diol (1 mole) was fed to 280 grams of methacrolein (4 moles) over a period of 40 minutes while stirring at 25° C.–30° C. After a reaction period of one hour at 28° C., 5.7 grams of anhydrous sodium acetate (.07 equivalent) were added to neutralize the catalyst. The mixture was fractionated under reduced pressure to yield 2-isopropenyl-4,5-divinyl-1,3-dioxolane having the following properties: boiling range of 48° C.–49° C./2 mm. Hg, $n_D^{30}$ of 1.4566, specific gravity at 20/20° C. of 0.946, purity (determined by analytical bromination) 99.7 percent, percent carbon found 71.9 (theory 72.3), percent hydrogen found 8.5 (theory 8.4). The yield of this material, based on the unsaturated diol, was 76 percent.

We claim:

1. A triply unsaturated 1,3-dioxolane having the structural formula:

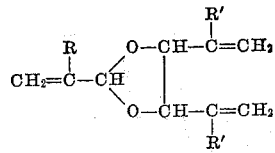

wherein R and R' are selected from the group consisting of hydrogen and lower alkyl.

2. 4,5-diisopropenyl-2-vinyl-1,3-dioxolane.
3. 2,4,5-triisopropenyl-1,3-dioxolane.
4. 2,4,5-trivinyl-1,3-dioxolane.
5. 2-isopropenyl-4,5-divinyl-1,3-dioxolane.
6. The process which comprises reacting an unsaturated aldehyde having the formula:

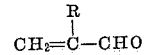

with a doubly unsaturated diol having the formula:

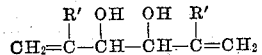

wherein R and R' are selected from the group consisting of hydrogen and lower alkyl at a temperature of from about 0° C. to about 100° C. and a pressure of from about 5 to about 150 p. s. i. a. for a period of from about 0.5 to about 50 hours.

No references cited.